Patented June 10, 1941

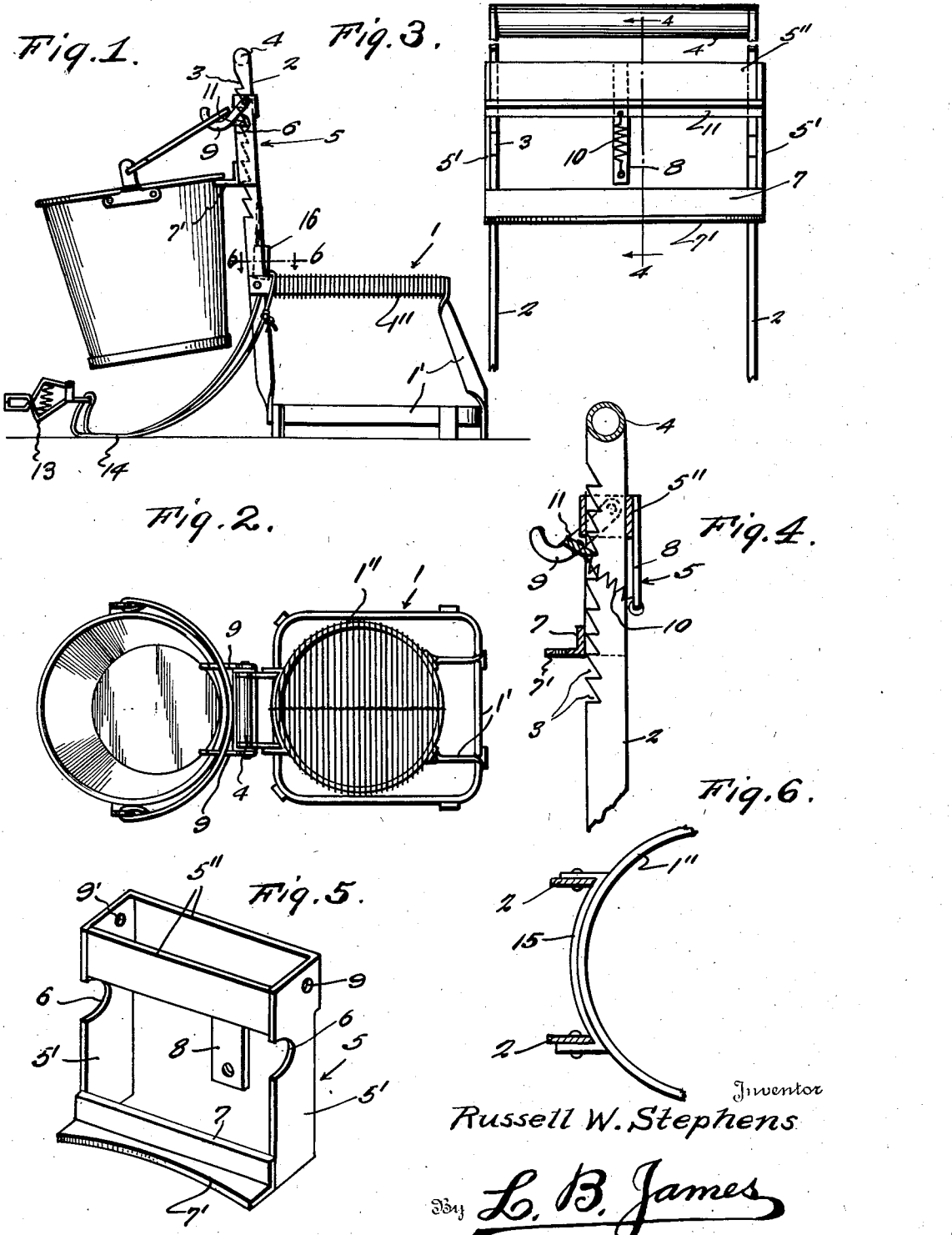

2,245,118

UNITED STATES PATENT OFFICE 2,245,118

MILKING STOOL

Russell W. Stephens, Lakeview, Mich.

Application March 1, 1940, Serial No. 321,793

2 Claims. (Cl. 31—57)

This invention relates to a combined milk stool and pail support, the general object of the invention being to provide a stool having an upright frame at its front provided with adjustable means for supporting the pail at the most advantageous position for receiving the milk from the teats of the cow.

The invention also consists in certain other features of construction, combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Fig. 1 is a side view of the invention, with a pail supported thereby.

Fig. 2 is a top plan view of Fig. 1.

Fig. 3 is a front view of the invention.

Fig. 4 is a section on line 4—4 of Fig. 3.

Fig. 5 is a perspective view of the sliding frame.

Fig. 6 is an enlarged sectional view approximately on line 6—6 of Fig. 1.

In these views, the numeral 1 indicates a stool, which includes a frame 1' and a circular seat part 1" which has twine or the like passed back and forth over the same to support a cushion. The front legs of the stool are extended upwardly to form the uprights 2, the front edges of which are formed with the notches 3, each of which is formed with a straight lower wall, as shown. The upper ends of these uprights are connected together by a handle bar 4. A frame 5, see Fig. 5, is slidably arranged on the uprights and includes the side pieces 5', which are formed with the notches 6 in their front edges, the front and rear upper cross pieces 5" and the lower cross piece 7 at its front. This piece 7 has attached thereto the rearwardly bowed strip 7', the front edge of which is of arcuate shape. A hanger 8 depends from the rear cross piece 5". A hook 9 is pivoted to the upper part of each side piece 5', the pivot passing through a hole 9' in each side piece. A coiled spring 10 has one end connected to the hanger 8 and its other end is connected to a cross bar 11 extending into the notches 6 and which has its ends connected with the hooks 9. This spring tends to hold the cross bar in engagement with one of the notches 3 with the bar resting on the straight lower wall of a notch, so as to hold the frame 5 against downward movement.

As shown in Figs. 1 and 2, the bail of the pail is placed over the hooks 9 with a portion of the rim of the pail resting on the strip 7', so that the pail is held in a slightly tilting position and by adjusting the frame 5 the pail can be placed in the desired position relative to the udder of the cow being milked. The device can be carried from one cow to another by simply grasping the handle 4 and the parts are so arranged that the pail with the milk therein will balance the stool. Also, if the cow should happen to place her foot in the pail, the milker can simply rise from the stool and permit the stool to tilt forwardly and then the pail will drop from the hooks and a new pail can then be put in place. The weight of the pail also helps to hold the cross bar 11 in the notches 3.

A tail holder 13 is attached to the flexible member 14 which is connected to a part of the stool and a jar 16 containing udder balm may be attached to the stool in any suitable manner.

The front legs are preferably connected to the seat by a substantially U shaped member 15, as shown in Fig. 6.

It is thought from the foregoing description that the advantages and novel features of the invention will be readily apparent.

It is to be understood that changes may be made in the construction, combination and arrangement of the several parts provided such changes fall within the scope of the appended claims.

What I claim and desire to protect by Letters Patent is:

1. A device of the class described comprising a stool, the front legs of which extend upwardly to form uprights, a frame slidably arranged on said uprights, said uprights having notches in their front edges, hooks pivoted to the frame, a cross bar connecting the hooks together and having portions for engaging the notches to hold the frame in adjusted position, and spring means for holding the bar in the notches.

2. A device of the class described comprising a stool, the front legs of which extend upwardly to form uprights, a frame slidably arranged on said uprights, said uprights having notches in their front edges, hooks pivoted to the frame, a cross bar connecting the hooks together and having portions for engaging the notches to hold the frame in adjusted position, spring means for holding the bar in the notches and a lip forming member on the lower part of the frame for engaging the rim of a pail, the bail of which is held by the hooks, said hooks and lip member holding the pail in a forwardly tilted position.

RUSSELL W. STEPHENS.